United States Patent
Tsuchida et al.

(10) Patent No.: US 7,261,471 B2
(45) Date of Patent: Aug. 28, 2007

(54) OPTICAL CONNECTOR HAVING SHIELDING MECHANISM

(75) Inventors: Masahiro Tsuchida, Shinagawa-ku (JP); Yoshiteru Abe, Musashino (JP); Masaru Kobayashi, Musashino (JP); Ryo Nagase, Musashino (JP); Koichi Arishima, Shibuya-ku (JP); Yuichi Koreeda, Shibuya-ku (JP); Akihiro Onogawa, Shibuya-ku (JP)

(73) Assignees: Hirose Electric Co., Ltd., Tokyo (JP); Nippon Telegraph and Telephone Corporation, Tokyo (JP); NTT Electronics Corporation, Tokyo (JP); Japan Aviation Electronics Industry Limited, Tokyo (JP)

( * ) Notice: Subject to any disclaimer, the term of this patent is extended or adjusted under 35 U.S.C. 154(b) by 0 days.

(21) Appl. No.: 11/365,727

(22) Filed: Mar. 1, 2006

(65) Prior Publication Data

US 2006/0147156 A1    Jul. 6, 2006

Related U.S. Application Data

(63) Continuation of application No. PCT/JP04/12531, filed on Aug. 31, 2004.

(30) Foreign Application Priority Data

Sep. 1, 2003    (JP) .............................. 2003-309048

(51) Int. Cl.
*G02B 6/38* (2006.01)

(52) U.S. Cl. ............................. 385/70; 385/55; 385/56; 385/58; 385/59; 385/72

(58) Field of Classification Search .................. 385/58, 385/78, 70
See application file for complete search history.

(56) References Cited

U.S. PATENT DOCUMENTS

| 5,317,663 | A  | * | 5/1994  | Beard et al. ................... 385/70 |
| 6,173,099 | B1 | * | 1/2001  | Kiernicki et al. .............. 385/78 |
| 6,461,055 | B1 | * | 10/2002 | Zimmel ........................ 385/73 |
| 6,599,024 | B2 | * | 7/2003  | Zimmel ........................ 385/73 |

FOREIGN PATENT DOCUMENTS

| JP | 9-211271 A   | 8/1997  |
| JP | 10-133061 A  | 5/1998  |
| JP | 2001-208938  | 8/2001  |
| JP | 2001-526803  | 12/2001 |

* cited by examiner

*Primary Examiner*—Frank G. Font
*Assistant Examiner*—James P. Hughes
(74) *Attorney, Agent, or Firm*—Cohen Pontani Lieberman & Pavane LLP

(57) ABSTRACT

There is provided an optical connector device which prevents leakage of light until right before connectors are connected to each other and is small-sized by a reduction in space for housing shutters. The optical connector device is an optical connector device comprising a first optical connector and a second optical connector. When shutters for shutting out light from the optical connectors are collided with each other, the shutters move to positions where they do not shut out the light. Therefore, the first optical connector and the second optical connector are connected to each other. After moving, the shutter of the first optical connector and the shutter of the second optical connector are inserted into the second optical connector while remaining contacting each other.

21 Claims, 8 Drawing Sheets

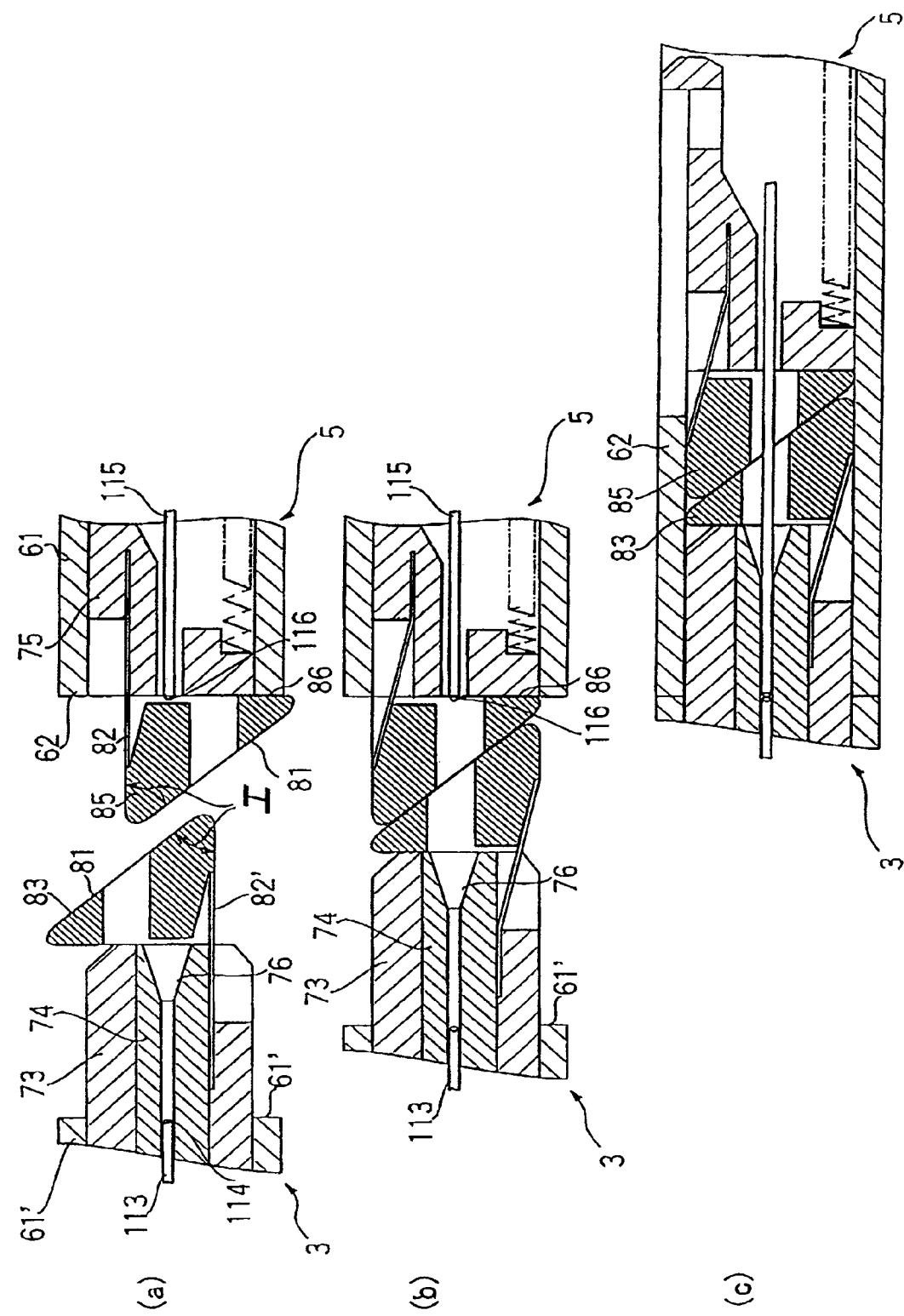

OPTICAL CONNECTOR HAVING SHIELDING MECHANISM

RELATED APPLICATION

This application is a U.S. Continuation Application of International Application PCT/JP2004/012531 filed 31 Aug. 2004.

BACKGROUND OF THE INVENTION (i) Field of the Invention

This invention relates to an optical connector having a shielding mechanism for preventing leakage of light from optical fibers.

(ii) Description of the Related Art

For example, Japanese Patent Laid-Open Publication No. 526803/2001 discloses a conventional optical connector having a shielding mechanism. Two of such optical connectors are connected to each other via an adapter. The adapter has a shutter for preventing leakage of light from optical fibers of the two optical connectors, and each of the optical connectors also has a shutter. As for the shutter of the adapter, when the connectors are inserted into the adapter, the shutter is pushed upward in the adapter or moved to an opening position by the action of the inserted connectors. As for the shutters of the connectors, on the other hand, when the connectors are inserted into the adapter, the shutters are pushed upward in the adapter or moved to the opening position through the interaction with the adapter.

Patent Literature 1
Japanese Patent Laid-Open Publication No. 208938/2001 (discloses an optical connector having no shutter.)

Patent Literature 2
Japanese Patent Laid-Open Publication No. 526803/2001 (discloses an optical connector having a shutter.)

However, the above optical connector has a problem that light leaks before the connectors are connected to each other because the shutters are already moved from the closing position to the opening position upon insertion of the connectors into the adapter. Further, there is also a problem that since the shutters are pushed upward in the adapter, considerable space is required for housing the shutters, thereby making the size of the device large.

The present invention has been conceived to solve the problems of the prior art, and an object thereof is to provide an optical connector having a shielding mechanism which prevents leakage of light until right before connectors are connected to each other. Another object of the present invention is to reduce the size of the device by reducing the size of space for housing the shutters.

SUMMARY OF THE INVENTION

To achieve the above objects, the present invention is an optical connector device comprising a first optical connector and a second optical connector, wherein when shutters for shutting out light from the optical connectors are collided with each other, the shutters move to positions where they do not shut out the light, whereby the first optical connector and the second optical connector are connected to each other; and after moving, the shutter of the first optical connector and the shutter of the second optical connector are inserted into the second optical connector while remaining contacting each other. Thereby, there can be provided the optical connector device which prevents leakage of light until right before the connectors are connected to each other, and the size of the device can be reduced by a reduction in the size of space for housing the shutters.

Further, the present invention is an optical connector device that optically connects a first optical connector and a second optical connector to each other by colliding them with each other in their longitudinal directions, wherein shutters which are constantly biased to be positioned at closing positions where they shut out light emitted from optical fibers disposed in the optical connectors and which can move in directions intersecting the longitudinal directions are provided on the sides of the first optical connector and second optical connector on which they are collided with each other; and when the shutter of the first optical connector and the shutter of the second optical connector are collided with each other, the shutter of the first optical connector and the shutter of the second optical connector are moved, against the biasing force, to opening positions where they do not shut out light, by force given by one of the shutters to the other shutter, whereby the first optical connector and the second optical connector can be connected to each other. Thereby, there can be provided the optical connector device which prevents leakage of light until right before the connectors are connected to each other.

The above optical connector device may be such that the shutter of the first optical connector and the shutter of the second optical connector have inclined surfaces that slide on each other when the shutters are collided with each other and the inclined surfaces are in a complementary relationship. Further, in the above optical connector device, the inclined surfaces may have a nearly triangular cross section which has a portion projecting at least toward the opposing shutter in the longitudinal direction. Thereby, movement of the shutters can be further smoothed.

The above optical connector device may be such that the optical fibers of the first optical connector move together with the shutter of the first optical connector; the optical fibers of the second optical connector do not move their relative positions to the second optical connector even when the shutter of the second optical connector relatively moves to the optical fibers of the second optical connector; the shutter of the first optical connector and the shutter of the second optical connector, after moved from the closing positions to the opening positions, are inserted into the second optical connector in the longitudinal direction while remaining contacting each other; and along with the insertion, the optical fibers of the first optical connector are inserted into the second optical connector, the optical fibers of the second optical connector are taken into an alignment member housing the optical fibers of the first optical connector, the end faces of the optical fibers of the first optical connector and the end faces of the optical fibers of the second optical connector are contacted with each other inside the alignment member, whereby the optical fibers of the first optical connector and the optical fibers of the second optical connector are connected to each other. Thereby, space for housing the shutters can be reduced, resulting in a reduction in the size of the device.

The above optical connector device may be such that the shutters are attached to protectors having portions surrounding the optical fibers at least inside the first optical connector and the second optical connector, and along with the insertion, the protectors together with the shutters are inserted into the second optical connector. Thereby, protection of the optical fibers can be further enhanced.

The above optical connector device may be such that the shutter attached to the protector of the second optical connector at least has a portion which projects from the insertion slot of the second optical connector in the direction intersecting the longitudinal direction, before moving from the closing position to the opening position; and before the shutter moves from the closing position to the opening position, the projecting portion prevents insertion of the protector and shutter of the second optical connector into the second optical connector or movement of the protector and shutter of the second optical connector inside the second optical connector. Thereby, the optical fibers are not broken by accident at the closing position.

In the above optical connector device, the first optical connector may be a jack connector, and the second optical connector may be a plug connector, and the plug connector and the jack connector may be connected to each other through an adapter.

According to the present invention, there can be provided an optical connector having a shielding mechanism which prevents leakage of light until right before connectors are connected to each other. Further, the size of the device can be reduced by reducing the size of space for housing the shutters.

BRIEF DESCRIPTION OF THE DRAWINGS

FIG. 8 is schematic cross-sectional views of the jack and the plug at the line 8-8 of FIG. 7, showing steps for connection in order of time.

DETAILED DESCRIPTION OF THE PREFERRED EMBODIMENTS

Hereinafter, an optical connector according to one embodiment of the present invention will be described.

In the present embodiment, an optical connector of a type wherein the "fiber wires (which are optical fibers without coating, while optical fibers with coating are fiber core wires)" of optical fibers are collided and connected with each other on their end faces will be particularly described. However, the present invention can be applied not only to the optical connector of the above type but also to an optical connector using fiber wires covered with zirconia or the like.

Further, in the present embodiment, a multicore optical connector, i.e. an optical connector comprising a plurality of optical fibers will be particularly illustrated as an example. However, as is obvious from the following description, the present invention can be applied not only to the multicore optical connector but also to a single-core optical connector comprising one optical fiber.

1. Overall Constitution

Figure 1:
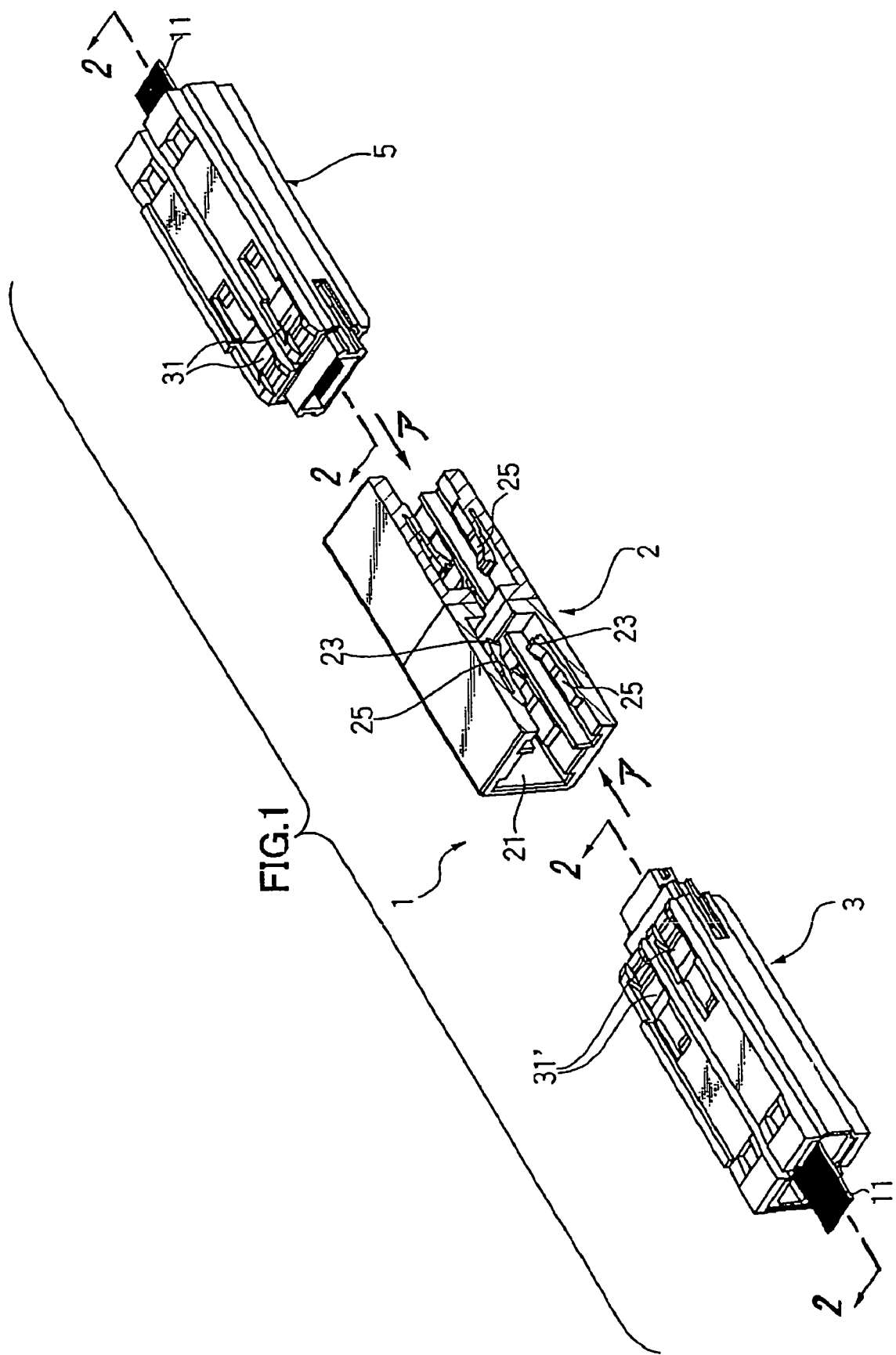
FIG. 1 is a schematic perspective view of an optical connector according to an embodiment of the present invention.

First, the overall constitution of this optical connector will be described with reference to FIGS. 1 to 3. FIG. 1 is a schematic perspective view of an optical connector 1 which comprises an adapter 2, and a jack connector (hereinafter referred to as "jack") 3 and a plug connector (hereinafter referred to as "plug") 5 which can be connected to each other via the adapter 2. However, in the drawing, a cross section in the longitudinal direction is shown for the adapter 2, and the jack 3 and the plug 5 are shown with some of their constituents omitted.

Figure 2:
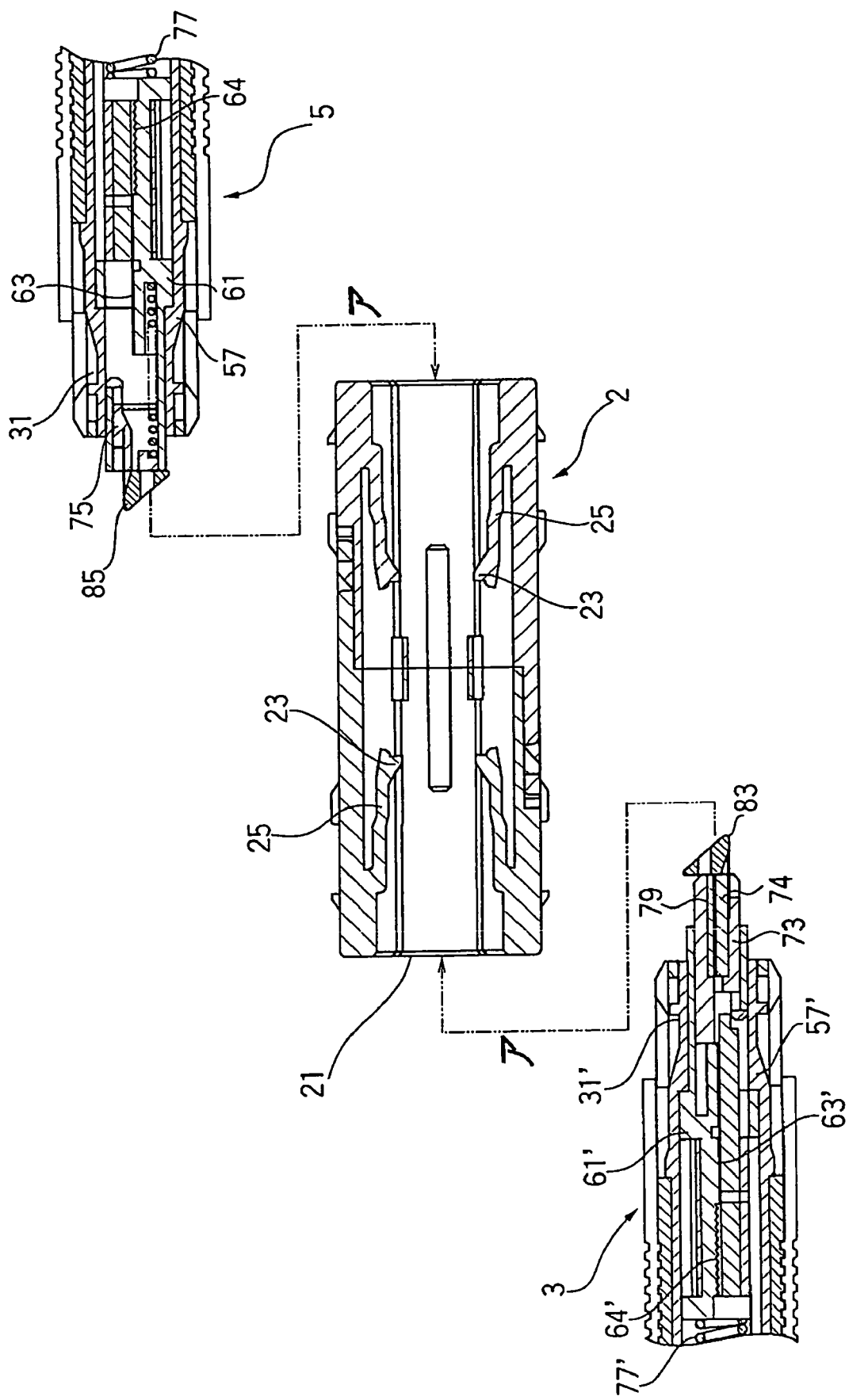
FIG. 2 is a diagram showing a cross section in the longitudinal direction of the optical connector of FIG. 1 before a jack and a plug are connected to an adapter.
Figure 3:
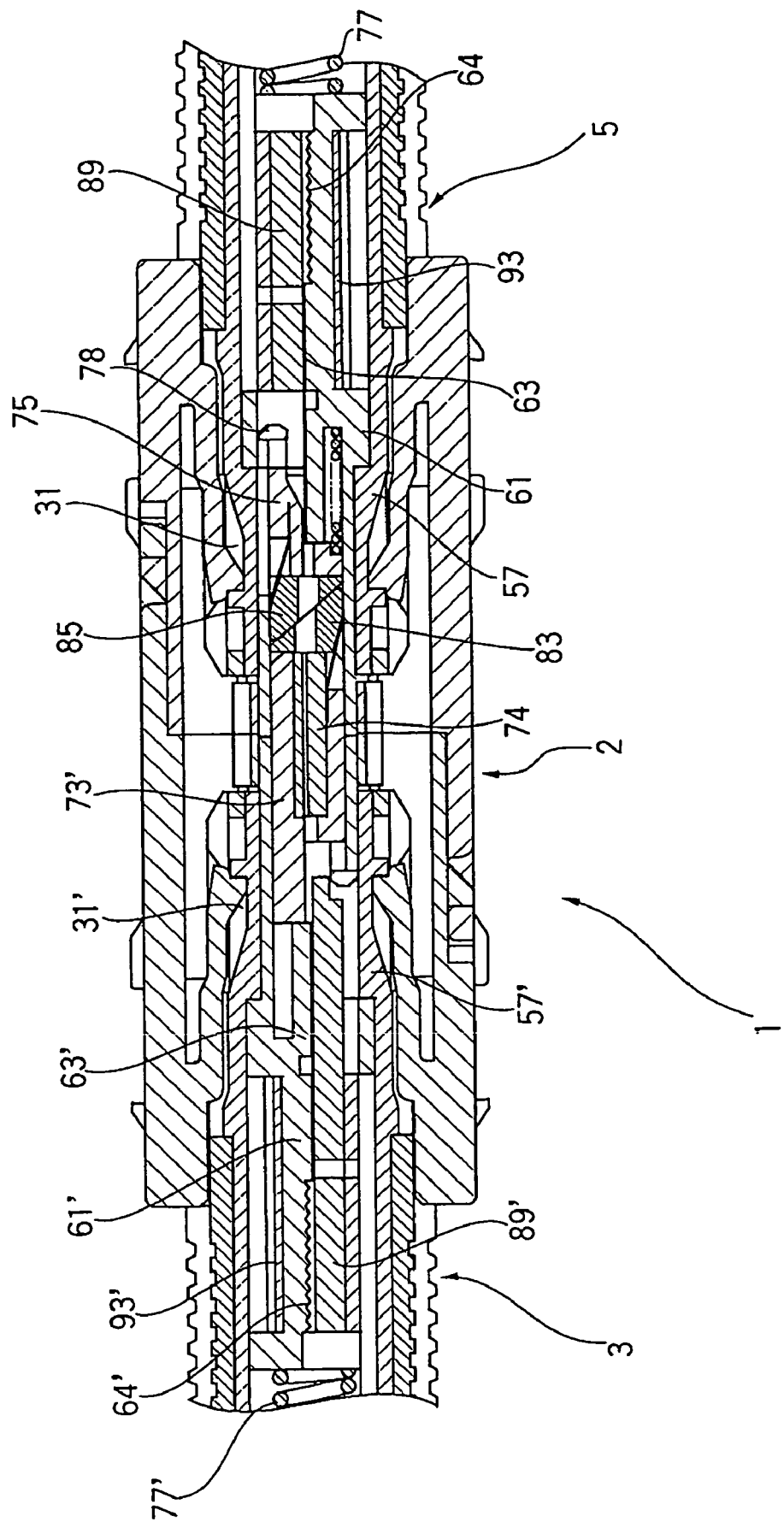
FIG. 3 is a diagram showing a cross section in the longitudinal direction of the optical connector of FIG. 1 after the jack and the plug are connected to the adapter.

Further, FIG. 2 is a schematic cross-sectional view of the jack 3 and plug 5 shown in FIG. 1 at the line 2-2, i.e. a schematic cross-sectional view of the jack 3 and plug 5 in the longitudinal direction before they are connected to the adapter 2, and FIG. 3 is a diagram showing these plug and jack being connected to the adapter 2 in the same manner as in FIG. 2. However, in FIGS. 2 and 3, some of the constituents of the jack 3 and plug 5 are shown in a simplified form. Further, although optical fibers are not particularly shown in these drawings, it is conceivable that the fibers pass through the center of the jack and plug over nearly the entire lengths thereof as shown in FIG. 1.

As is clear from these drawings, the adapter 2 is formed in a cylindrical form and houses nearly the halves of the jack 3 and plug 5 from openings 21 which are formed on both sides of the adapter 2. Through the openings 21 of the adapter 2, the jack 3 and the plug 5 are inserted into the adapter 2 in the directions indicated by the arrows A in FIG. 1, whereby the jack 3 and the plug 5 contact each other at their front ends and can be optically connected to each other. More specifically, in the central portion of the adapter 2, fiber wires of the jack 3 and plug 5 contact each other at their ends and can be connected to each other. FIG. 3 shows the jack 3 and the plug 5 being optically connected.

To hold the jack 3 and the plug 5 inside the adapter 2 after they are inserted in the adapter 2, locking portions are provided in the jack 3, plug 5 and adapter 2. The locking portions 31 and 31' of the jack 3 and plug 5 are formed in a concave form on the upper and lower surfaces of the external frames thereof (indicated by "57" in FIG. 5 to be referred to later). Meanwhile, the locking portions 23 of the adapter 2 are provided at the front ends of four cantilever-shaped locking pieces 25 which are biased toward the center of the adapter 2 inside the adapter 2. When the jack 3 and the plug 5 are inserted into the adapter 2 to some extent, the convex locking portions 23 of the adapter 2 snap into the concave locking portions 31 and 31' of the jack 3 and plug 5 by the biasing action of the locking pieces 25, and the jack 3 and the plug 5 are held inside the adapter 2 by a predetermined force.

2. Plug

Figure 4:
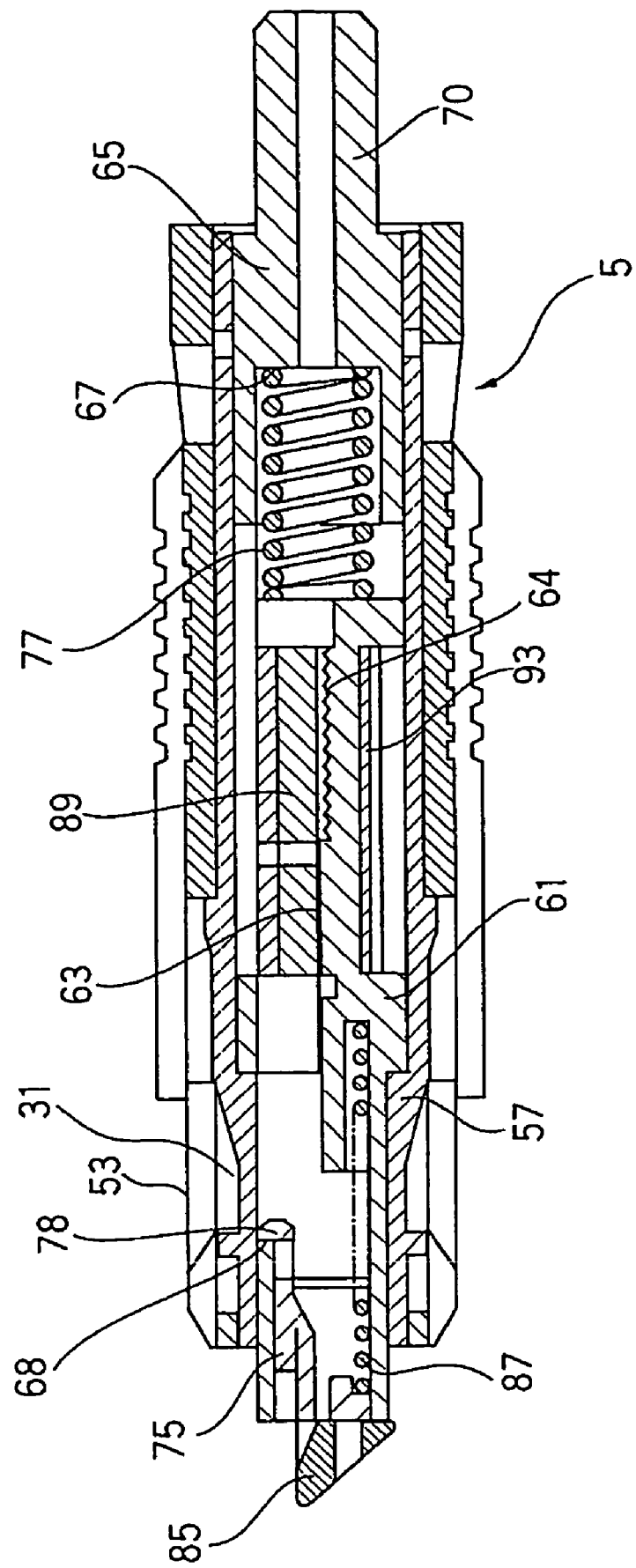
FIG. 4 is a diagram showing a cross section in the longitudinal direction of the plug according to one embodiment of the present invention.
Figure 5:
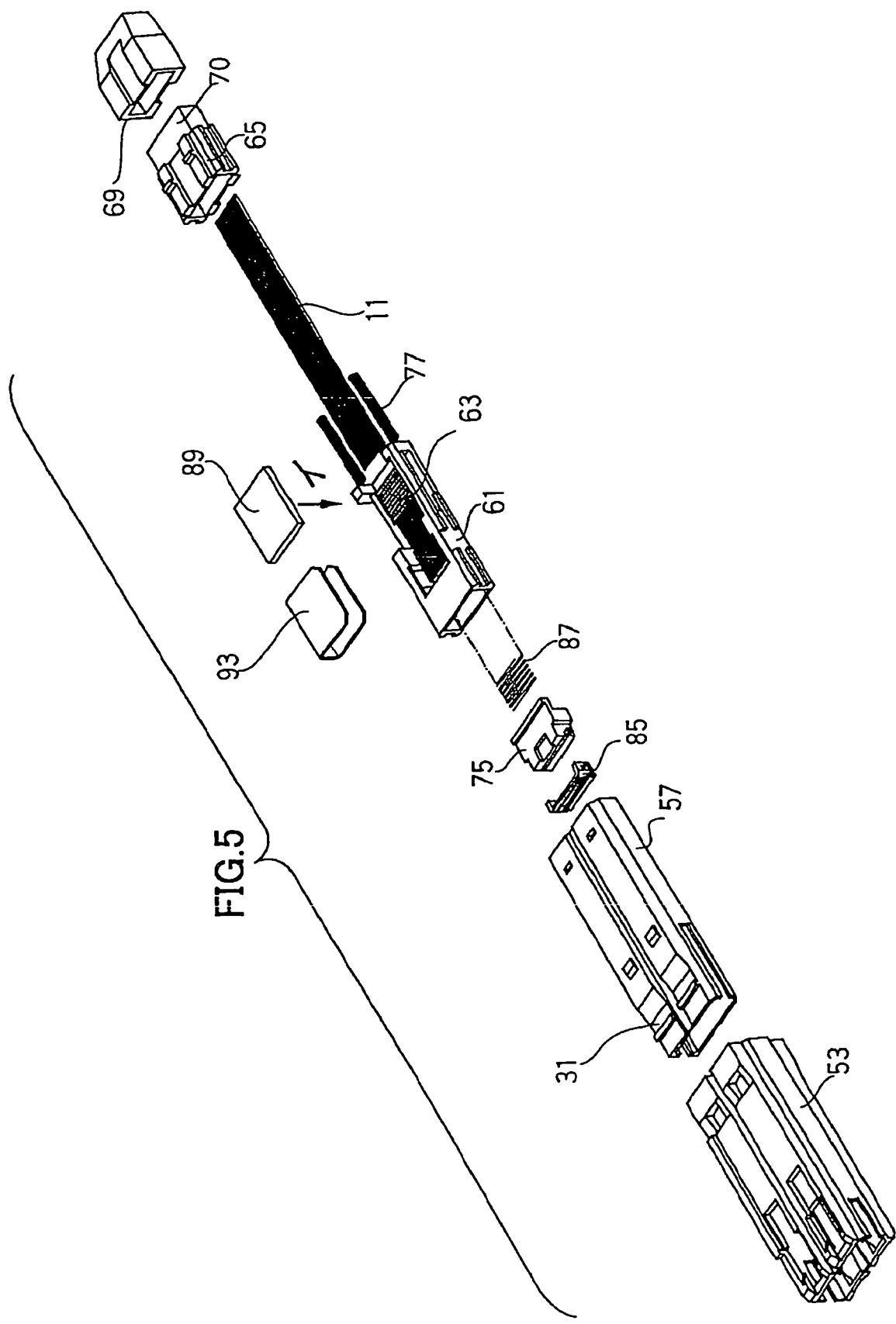
FIG. 5 is a schematic exploded perspective view of the main constituents of the plug according to one embodiment of the present invention.

Next, the constitution of the plug will be further described with reference to FIGS. 4 and 5. FIG. 4 is a diagram showing a longitudinal cross section of the whole plug in the same manner as in FIGS. 2 and 3, and FIG. 5 is a schematic exploded perspective view of the main constituents of the plug. Some constituents of the plug are not shown in these drawings as well.

As shown in these drawings, the outermost of the plug 5 is constituted by a housing 53. Right beneath the housing 53, the cylindrical external frame 57 is provided in such a manner that it is nearly fully covered by the housing 53.

Inside the external frame 57, an internal frame 61 is nearly fully housed in such a manner that it can slide in its longitudinal direction. Further, at the rear end of the external frame 57, a stopper 65 is provided that closes the rear end of the external frame 57 when its front end is housed in the rear end of the external frame 57. Further, a portion 70 of the read end of the stopper 65 is formed with a somewhat smaller circumference that that of the rest of the stopper 65, and a boot 69 can also be attached so as to cover the smaller formed portion 70. Between the internal frame 61 and the stopper 65, a spring 77 is provided such that a portion thereof is housed in the hollow 67 of the front end of the stopper 65. By the action of the spring 77, the internal frame 61 is constantly biased, in the longitudinal direction of the plug, toward the side which contacts the jack. As a result, impact when the jack 3 and the plug 5 are connected to each other, i.e., when the internal frames of the plug 5 and jack 3 collide with each other, can be absorbed.

Inside the front end of the internal frame 61, there is provided a protector 75 which can slide in the longitudinal direction of the plug 5. The protector 75 is nearly fully covered by the internal frame 61. The protector 75 surrounds and protects optical fibers 11, particularly fiber wires in this case, in at least a portion thereof. An openable and closable shutter 85 which is attached to the protector 75 prevents leakage of light from the optical fibers 11 (the protector 75 is not shown in FIG. 1). This will be further described later. Between the internal frame 61 and the protector 75, a spring 87 is provided such that a portion thereof is housed in the hollow of the front end of the internal frame 61. By the action of the spring 87, the protector 75 is constantly biased, in the longitudinal direction of the internal frame 61, toward the side which contacts the jack. Even in such a state, the internal frame 61 does not come off from the front end of the external frame 57 since a portion 78 of the protector 75 and a portion 68 of the internal frame 61 collide with each other in a direction intersecting the longitudinal direction. Further, even when the shutter 85 and the protector 75 are relatively moved to the internal frame 61 against the force of the spring 87, constituents other than the shutter 85 and the protector 75, for example, the optical fibers 11 (not shown), maintain their relative positions to the internal frame 61 (plug 5 connector). Accordingly, with respect to the optical fibers 11, when the shutter 85 and the protector 75 are relatively moved to the internal frame 61, the optical fibers 11 are protected only by the internal frame 61 and not protected by the protector 75.

As for the remaining portion of the internal frame 61 excluding its front end, the upper surface and side face of the remaining portion are partially removed, thereby exposing the inside thereof. Upon assembly of the plug, a plate 89 is housed in this exposed portion 63 from above the exposed side in the direction indicated by the arrow B in FIG. 5 (refer to FIG. 5). Thereafter, all of the exposed portion 63, plate 89 and internal frame 61 are sandwiched and held between the opposing surfaces 94a and 94b of a horseshoe-shaped clamper 93 on the upper surface of the plate 89 and the bottom surface of the internal frame 61. As for insertion of the optical fibers, the optical fibers are inserted with the opposing surfaces of the clamper 93 opened wide by a wedge tool. As a result, the optical fibers 11 between the exposed portion 63 and the plate 89 can be held by a predetermined force due to the action of the force of the clamper 93. Further, to enhance the holding force of the optical fibers 11 held by the damper 93, for example, projections 64 may be formed in the exposed portion 63 of the internal frame 61. Further, to position the optical fibers, for example, V-shaped grooves 72 and 72' may also be formed in the exposed portion 63 of the internal frame 61 with space 60 therebetween.

3. Jack

Figure 6:
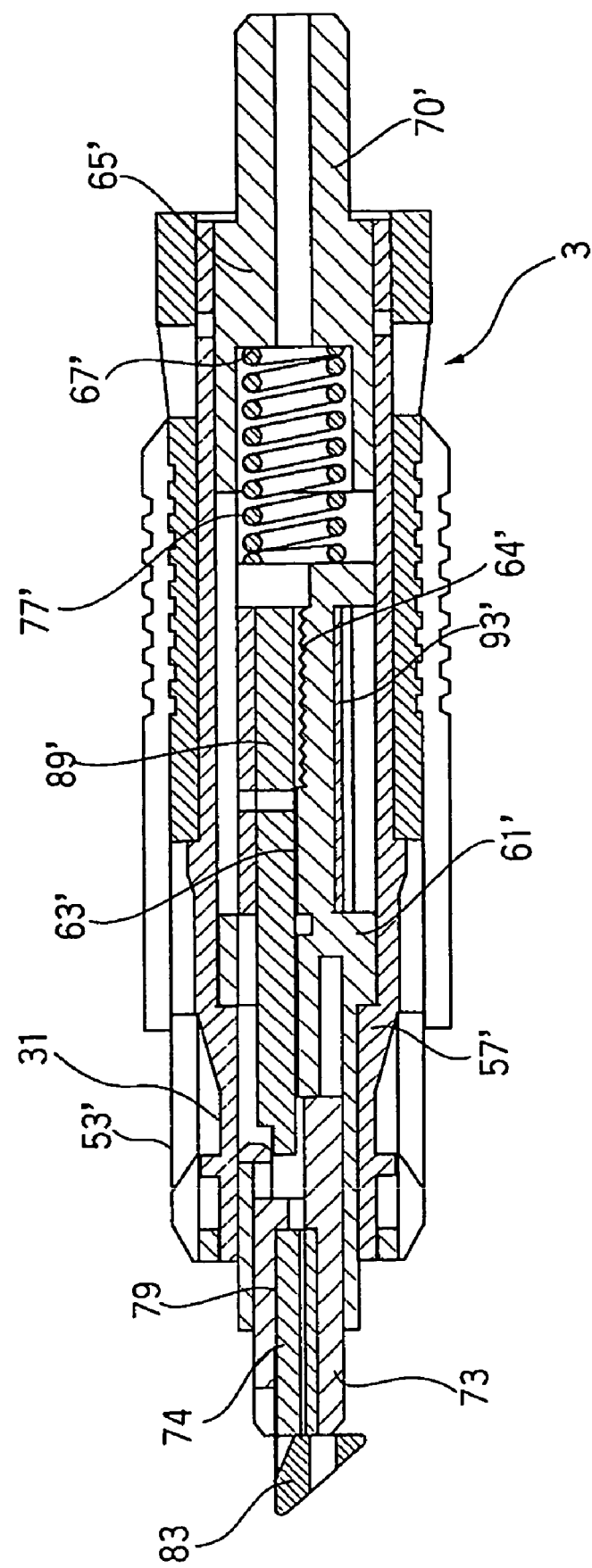
FIG. 6 is a diagram showing a cross section in the longitudinal direction of the jack according to one embodiment of the present invention.

FIG. 6 is a longitudinal cross-sectional view of the jack 3. FIG. 6 corresponds to FIG. 4 which shows the plug 5. In FIG. 6, the same constituents as those shown in FIG. 4 are indicated by reference numbers with "'" attached thereto. As is obvious from comparison of these drawings, the jack 3 is different from the plug 5 with respect only to a protector and a spring which biases the protector, and the remaining constituents are completely the same as those of the plug 5. Hereinafter, only the differences will be mainly described.

As described above with reference to FIG. 4 and other drawings, the protector 75 of the plug is provided in the internal frame 61 slidably in the longitudinal direction of the internal frame 61 and constantly biased by the action of the spring 87, and the protector 75 is nearly fully housed in the internal frame 61. Meanwhile, the protector 73 of the jack is fixed to an internal frame 61' with a portion thereof projecting from the internal frame 61' as shown in FIG. 6. In this case, no spring is used, and unlike the protector 75 of the plug, the protector 73 of the jack does not slide inside the internal frame 61'. Further, unlike the protector 75 of the plug, an alignment member 74 that receives the fiber wires of the plug 5 and aligns them with the fiber wires of the jack 3 is fitted in a hollow 79 of the front end of the protector 73.

4. Relationship Between Plug and Jack

As described above, since the jack 3 and the plug 5 are different from each other with respect only to the protectors 73 and 75 and peripheral components thereof, they can be used either as a plug or as a jack by replacing these components. More specifically, when no spring is used and the protector 73 which incorporates the alignment member is fitted in the internal frame 61 of the plug, it can be used as the jack 3, while when a spring is used and the protector 75 which incorporates no alignment member is fitted in the internal frame 61' of the jack, it can be used as the plug 5. Further, it is also possible to incorporate the alignment member 74 and the shutter 83 into the protector 73 to form them into one assembly and remove them as one assembly. According to the above constitution, the jack 3 and the plug 5 do not need to be produced separately and can share almost all components. Accordingly, a reduction in production cost can be achieved with such a constitution. Further, as to the jack 3 in particular, since the protector 73 which incorporates the alignment member 74 can be detached from the internal frame 61', the alignment member 74 can be cleaned easily, whereby the performance of the alignment can be kept at high level constantly. As is obvious, the above constitution, i.e. the constitution which allows the jack and the plug to be used interchangeably merely by replacing some components, can be applied not only to an optical connector but also to various other connectors such as an electric connector. It should be appreciated that this constitution can also be applied to a case (case as shown in FIG. 1) where no shutter is attached to the protector.

5. Method of Operation

Figure 7:
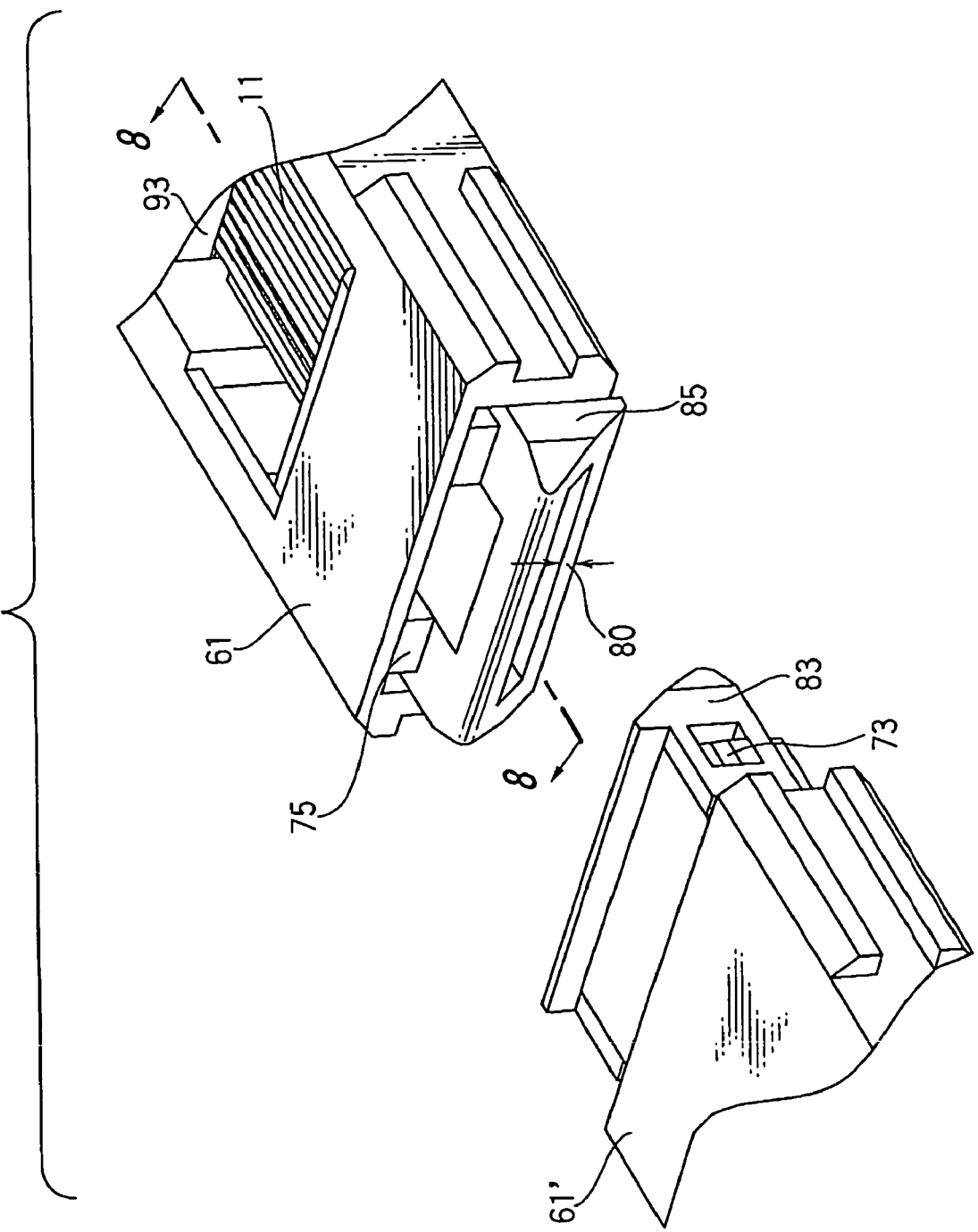
FIG. 7 is a schematic perspective view of the front ends of the jack and plug.

Next, with reference to FIGS. 7 and 8, a method of optically connecting the jack and the plug using the optical connector of the present invention, i.e., a method of connecting the fiber wires of the plug and the fiber wires of the jack with each other, will be described. FIG. 7 is a schematic perspective view of the front ends of the jack and plug. FIG.

8 is schematic cross-sectional views of the jack and the plug at the line 8-8 in FIG. 7. FIG. 8 shows steps for connection in order of time.

As is obvious from FIG. 8, when the plug 5 is assembled, the front ends of optical fibers placed in the plug 5, i.e. the end faces 116 of fiber wires 115, reach the same position as that of the front end of the internal frame 61. However, the front ends of the fiber wires 115 have no support. Thus, in the plug 5, the optical fibers are held in the form of cantilevers such that the fiber wires 115 at the front ends of the optical fibers can move freely to some extent.

Meanwhile, when the jack 3 is assembled, the front ends of optical fibers placed in the jack 3, i.e. the end faces 114 of fiber wires 113, reach the middle of the alignment member 74. Hence, unlike the fiber wires 115 which can move freely, the fiber wires 113 of the jack do not move freely. The end faces 114 of the fiber wires 113 of the jack 3 and the end faces 116 of the fiber wires 115 of the plug 5 are brought into contact with each other inside the alignment member 74, resulting in connection of the fiber wires 113 and the fiber wires 115. However, the jack 3 is the same as the plug 5 in that when the jack 3 is assembled, the end faces 114 of the fiber wires 113 reach the same position as that of the front end of the internal frame 61.

The shutters 83 and 85 attached to the protectors 73 and 75 of the jack and plug shut out light leaking from these fiber wires 113 and 115. These shutters 83 and 85 are attached to the protectors 73 and 75 such that they can slide in a direction intersecting the longitudinal direction of the jack and plug, respectively. These shutters 83 and 85 are constantly biased by the action of flat springs 82 whose one ends are fixed to the internal frames 61 and 61' and the other ends are fixed to one side faces of the shutters 83 and 85. When no force is applied to the shutters 83 and 85, these shutters are positioned at closing positions as shown in FIG. 8(a), i.e. positions where they substantially shut out light from the optical fibers 11, i.e. light emitted from the front ends of the fiber wires 113 and 115. Meanwhile, when these shutters 83 and 85 are collided with each other inside the adapter 2, they are slid against the biasing force of the flat springs 82 by the interaction while sliding their inclined surfaces 81 on each other, and the shutters 83 and 85 move from the closing positions as shown in FIG. 8(a) to opening positions as shown in FIGS. (b) and (c), i.e. positions where they do not shut out light emitted from the front ends of the fiber wires 113 and 115. As a result, the jack 3 and the plug 5 are optically connected. As is obvious, according to such a constitution, the plug 5 and the jack 3 are optically connected only when they are collided with each other and can prevent the influence of leakage of light on the eyes accordingly. Further, the entrance of dust into the protectors can be prevented by the shutters 83 and 85, and connection loss can also be reduced by them.

To make the action of the shutters more effective, the shutters preferably have a nearly triangular cross section projecting at least toward the opposing shutter in the longitudinal direction of the jack 3 and plug 5. Further, the inclined surfaces 81 preferably have shapes that complement each other as shown in FIG. 8. The inclination angles D may be about 40 degrees, for example. Such shapes can equalize forces applied by the shutters 83 and 85 to each other when the shutters 83 and 85 of the plug 5 and the shutters 83 and 85 of the jack are collided with each other. In this case, movements of the shutters 83 and 85 from the closing positions to the opening positions occur nearly simultaneously in the same manner. Therefore, a possibility of light leakage can be reduced as much as possible. However, the shape of the shutter may be any shape as long as it shuts out light from the optical fibers 11, and other parts may have any shape. For example, the thickness 80 (shown in FIG. 7) of the shutter may be thinner than that shown in the drawing or may be none; in other words, the size of the opening of the shutter may be larger.

Next, the interaction between the shutter 85 of the plug and the shutter 83 of the jack will be described in more detail. When these shutters are collided with each other, the effect of force applied by one of the shutters to the other shutter can be separated in two directions, i.e. the longitudinal direction and a direction intersecting the longitudinal direction. As is obvious, by the latter force, the shutters 83 and 85 of the jack and plug are moved from the closing positions as shown in FIG. 8(a) to the opening positions as shown in FIGS. (b) and (c), nearly simultaneously in the same manner. Meanwhile, the effect of the former force is somewhat different between the jack and the plug. More specifically, in the jack 3, since the protector 73 having the shutter 83 attached thereto somewhat projects from the internal frame 61' and is not relatively moved to the internal frame 61', the shutter 83 of the jack is merely pressed against the plug 5 side by the former force in the longitudinal direction. Meanwhile, in the plug 5, since the protector 75 having the shutter 85 attached thereto is provided slidably inside the internal frame 61, the shutter 85 of the plug 5 together with a portion of the protector 73 is inserted into the internal frame 61 of the plug by the former force in the longitudinal direction, while remaining contacting the shutter 83 of the jack. Further, concurrently with this, the protector 75 of the plug moves inside the internal frame 61 of the plug. However, since the internal frame 61 of the plug and the internal frame 61' of the jack are the same and thus of the same size, only the projecting portion of the protector 73 from the internal frame 61' of the jack is inserted into the internal frame 61 of the plug. Eventually, the jack 3 and the plug 5 are pressed against each other until the front edges 62 and 62' of the internal frames 61 and 61' thereof collide with each other. This state is shown in FIG. 8(c).

For a better understanding, the above described interaction between the jack and the plug will be further described, with a focus on the fiber wires 113 and 115 this time. When the jack and the plug approach each other, only the shutter 85 and the protector 75 relatively move to other components in the plug, and the fiber wires 115 stay at the same position. As a result, the protector 75 is removed from the fiber wires 115 of the plug, and the fiber wires 115 are protected only by the internal frame 61. Meanwhile, in the jack, the shutter 83 and the protector 73 do not change their relative positions to the internal frame 61', and the fiber wires 113 are also inserted into the internal frame 61 of the plug together with the shutter 83 and the protector 73. As a result, along with insertion of the shutter 83, protector 73 and fiber wires 113 of the jack into the internal frame 61 of the plug, the fiber wires 115 of the plug are inserted into the alignment member 74 provided in the protector 73 of the jack. In the alignment member 74, the fiber wires 113 of the jack are partially housed in advance. Therefore, when the fiber wires 115 of the plug are inserted into the alignment member 74, the end faces of the fiber wires 115 and the end faces of the fiber wires 113 contact each other, whereby the fiber wires 115 and the fiber wires 113 are connected. To facilitate insertion of the fiber wires 115 of the plug into the alignment member 74, inclined guide surfaces 76 may be provided which converge from the front end of the protector 73 toward the front ends of the fiber wires 113 of the jack 3.

According to the above constitution, leakage of light from the jack to the plug or vice versa does not occur until nearly right before the jack and the plug are optically connected. Further, since the shutters of both the jack and the plug can be housed inside the internal frame of the plug, the jack and the plug share space, thereby making it possible to reduce the size of the device.

As is obvious, the shutter 85 of the plug is inserted into the internal frame 61 by the force in the longitudinal direction or the protector 75 moves inside the internal frame 61 only after the shutter is moved from the closing position to the opening position by the force in the intersecting direction. This is because before the shutter 85 of the plug is moved from the closing position to the opening position, a portion 86 of the back of the shutter 85 sticks out beyond the edge 62 of the insertion slot of the internal frame 61 in the direction intersecting the longitudinal direction of the plug and contacts the edge 62, thereby serving as a stopper for stopping the protector 75 from moving into the internal frame 61. Thus, the shutter 85 prevents movement of the protector 75 at its closing position and permits movement thereof at its opening position. Consequently, with the shutter 85 at the closing position, the protector 75 is not slid into the internal frame 61 and therefore does not break the optical fibers 115 by accident. By the same reason, the shutter 83 of the jack and a portion of the protector 73 are inserted into the internal frame 61 of the plug by the force in the longitudinal direction only after the shutter is moved from the closing position to the opening position by the force in the intersecting direction.

6. Mounting Method

The adapter 2 is preferably mounted alone on a substrate, panel or the like by a technique such as soldering before the jack 3 and the plug 5 are connected to the adapter 2. As is obvious from the above description, an alignment member for aligning optical fibers is not particularly provided in the adapter. Hence, according to such a mounting order, malfunction of the alignment member caused by heat, vibration or the like in soldering the adapter on a substrate or the like does not occur; in other words, stress in the connection of the fiber wires can be reduced. Further, the device is easily mounted because the optical connector itself is not mounted on a substrate and it is sufficient to mount the adapter. In addition, it is easy to detach the jack and the plug from the adapter. The jack and the plug may be attached to the adapter separately or simultaneously.

7. Others

In the above embodiment, the optical connector using the adapter has been illustrated as an example. However, the present invention is also applicable to an optical connector using no adapter. In this case, either the jack or the plug or both are provided with a locking portion which allows connection between them.

Further, although it has been described in the above embodiment that the side faces of the shutters of the jack and plug preferably have a smooth triangular form, the side faces may be uneven to a certain extent.

What is claimed is:

1. An optical connector device comprising:
   a first optical connector; and
   a second optical connector;
   wherein the first optical connector is provided with a shutter for shutting out light from the first optical connector, the second optical connector is provided with a shutter for shutting out light from the second optical connector, and the shutters are arranged to be moved to positions where they do not shut out the light by colliding the shutters with each other, whereby the first optical connector and the second optical connector are connected to each other, and the shutter of the first optical connector and the shutter of the second optical connector are inserted into a frame of the second optical connector while remaining contacting each other.

2. The optical connector device in claim 1, wherein the first optical connector and the second optical connector can be optically connected with each other by colliding them with each other in their longitudinal directions, the shutter of the first optical connector and the shutter of the second optical connector which are constantly biased to be positioned at closing positions where the shutter of the first optical connector shuts out light from an optical fiber disposed in the first optical connector and the shutter of the second optical connector shuts out light from an optical fiber disposed in the second optical connector and which can move in directions intersecting the longitudinal directions are provided on the sides of the first optical connector and second optical connector on which they are collided with each other, and in a case where the shutter of the first optical connector and the shutter of the second optical connector are collided with each other, the shutter of the first optical connector and the shutter of the second optical connector are arranged to be moved, against the biasing force, to opening positions where they do not shut out light, by force applied by one of the shutters to the other shutter, whereby the first optical connector and the second optical connector can be connected to each other.

3. The optical connector device of claim 2, wherein the shutter of the first optical connector and the shutter of the second optical connector have inclined surfaces that slide on each other by colliding them with each other, and the inclined surfaces are in a complementary relationship.

4. The optical connector device of claim 3, wherein the inclined surfaces have a nearly triangular cross section which has a portion projecting at least toward the opposing shutter in the longitudinal direction.

5. The optical connector device of claim 4, wherein the optical fiber of the first optical connector are arranged to move, in the longitudinal direction, together with the shutter of the first optical connector, the optical fiber of the second optical connector cannot move its relative position to the second optical connector even if the shutter of the second optical connector is relatively moved, in the longitudinal direction, to the second optical connector, the shutter of the first optical connector and the shutter of the second optical connector which are biased, to the opening positions, are inserted into the frame of the second optical connector in the longitudinal direction while remaining contacting each other, and along with the insertion of the shutter of the first optical connector and the shutter of the second optical connector, the optical fiber of the first optical connector is inserted into the frame of the second optical connector, the optical fiber of the second optical connector is taken into an alignment member housing the optical fiber of the first optical connector, and the end face of the optical fiber of the first optical connector and the end face of the optical fiber of the second optical connector are contacted with each other inside the alignment member, whereby the optical fiber of the first optical connector and the optical fiber of the second optical connector are connected to each other.

6. The optical connector device of claim 5, wherein the shutter of the first optical connector is attached to a protector having a portion surrounding the optical fiber at least inside the first optical connector, the shutter of the second optical connector is attached to a protector having a portion surrounding the optical fiber at least inside the second optical connector, and along with the insertion of the shutters, the protectors together with the shutters are inserted into the frame of the second optical connector.

7. The optical connector device of claim 6, wherein the shutter attached to the protector of the second optical connector at least has a portion which projects from the insertion slot of the second optical connector in the direction intersecting the longitudinal direction, and the projecting portion prevents insertion of the protector and shutter of the second optical connector which is not biased to the opening position into the frame of the second optical connector or movement of the protector of the second optical connector inside the frame of the second optical connector.

8. The optical connector device claim 3, wherein the optical fiber of the first optical connector are arranged to move, in the longitudinal direction together with the shutter of the first optical connector, the optical fiber of the second optical connector cannot move its relative position to the second optical connector even if the shutter of the second optical connector is relatively moved, in the longitudinal direction, to the optical fibers of the second optical connector, the shutter of the first optical connector and the shutter of the second optical connector which are biased, to the opening positions, are inserted into the frame of the second optical connector in the longitudinal direction while remaining contacting each other, and along with the insertion of the shutter of the first optical connector and the shutter of the second optical connector, the optical fiber of the first optical connector is inserted into the frame of the second optical connector, the optical fiber of the second optical connector is taken into an alignment member housing the optical fiber of the first optical connector, the end face of the optical fiber of the first optical connector and the end face of the optical fiber of the second optical connector are contacted with each other inside the alignment member, whereby the optical fiber of the first optical connector and the optical fiber of the second optical connector are connected to each other.

9. The optical connector device of claim 8, wherein the shutter of the first optical connector is attached to a protector having a portion surrounding the optical fiber at least inside the first optical connector, the shutter of the second optical connector is attached to a protector having a portion surrounding the optical fiber at least inside the second optical connector, and along with the insertion of the shutters, the protectors together with the shutters are inserted into the frame of the second optical connector.

10. The optical connector device of claim 9, wherein the shutter attached to the protector of the second optical connector at least has a portion which projects from the insertion slot of the second optical connector in the direction intersecting the longitudinal direction, and the projecting portion prevents insertion of the protector and shutter of the second optical connector which is not biased to the opening position into the frame of the second optical connector or movement of the protector of the second optical connector inside the frame of the second optical connector.

11. The optical connector device of claim 4, wherein the shutter of the first optical connector is attached to a protector having a portion surrounding the optical fiber at least inside the first optical connector, the shutter of the second optical connector is attached to a protector having a portion surrounding the optical fiber at least inside the second optical connector, and along with the insertion of the shutters, the protectors together with the shutters are inserted into the frame of the second optical connector.

12. The optical connector device of claim 11, wherein the shutter attached to the protector of the second optical connector at least has a portion which projects from the insertion slot of the second optical connector in the direction intersecting the longitudinal direction, and the projecting portion prevents insertion of the protector and shutter of the second optical connector which is not biased to the opening position into the frame of the second optical connector or movement of the protector of the second optical connector inside the frame of the second optical connector.

13. The optical connector device of claim 3, wherein the shutter of the first optical connector is attached to a protector having a portion surrounding the optical fiber at least inside the first optical connector, the shutter of the second optical connector is attached to a protector having a portion surrounding the optical fiber at least inside the second optical connector, and along with the insertion of the shutters, the protectors together with the shutters are inserted into the frame of the second optical connector.

14. The optical connector device of claim 13, wherein the shutter attached to the protector of the second optical connector at least has a portion which projects from the insertion slot of the second optical connector in the direction intersecting the longitudinal direction, and the projecting portion prevents insertion of the protector and shutter of the second optical connector which is not biased to the opening position into the frame of the second optical connector or movement of the protector of the second optical connector inside the frame of the second optical connector.

15. The optical connector device of claim 2, wherein the optical fiber of the first optical connector are arranged to move, in the longitudinal direction, together with the shutter of the first optical connector, the optical fiber of the second optical connector cannot move its relative position to the second optical connector even if the shutter of the second optical connector is relatively moved, in the longitudinal direction, to the second optical connector, the shutter of the first optical connector and the shutter of the second optical connector which are biased, to the opening positions, are inserted into the frame of the second optical connector in the longitudinal direction while remaining contacting each other, and along with the insertion of the shutter of the first optical connector and the shutter of the second optical connector, the optical fiber of the first optical connector is inserted into the frame of the second optical connector, the optical fiber of the second optical connector is taken into an alignment member housing the optical fiber of the first optical connector, and the end face of the optical fiber of the first optical connector and the end face of the optical fiber of the second optical connector are contacted with each other inside the alignment member, whereby the optical fiber of the first optical connector and the optical fiber of the second optical connector are connected to each other.

16. The optical connector device of claim 15, wherein the shutter of the first optical connector is attached to a protector having a portion surrounding the optical fiber at least inside the first optical connector, the shutter of the second optical connector is attached to a protector having a portion surrounding the optical fiber at least inside the second optical connector, and along with the insertion of the shutters, the protectors together with the shutters are inserted into the frame of the second optical connector.

17. The optical connector device of claim 16, wherein the shutter attached to the protector of the second optical connector at least has a portion which projects from the insertion slot of the second optical connector in the direction intersecting the longitudinal direction, and the projecting portion prevents insertion of the protector and shutter of the second optical connector which is not biased to the opening position into the frame of the second optical connector or movement of the protector of the second optical connector inside the frame of the second optical connector.

18. The optical connector device of claim 2, wherein the shutter of the first optical connector is attached to a protector having a portion surrounding the optical fiber at least inside the first optical connector, the shutter of the second optical connector is attached to a protector having a portion surrounding the optical fiber at least inside the second optical connector, and along with the insertion of the shutters, the protectors together with the shutters are inserted into the frame of the second optical connector.

19. The optical connector device of claim 18, wherein the shutter attached to the protector of the second optical connector at least has a portion which projects from the insertion slot of the second optical connector in the direction intersecting the longitudinal direction, and the projecting portion prevents insertion of the protector and shutter of the second optical connector which is not biased to the opening position into the frame of the second optical connector or movement of the protector of the second optical connector inside the frame of the second optical connector.

20. The optical connector device of claim 1, wherein the first optical connector is a jack connector, and the second optical connector is a plug connector.

21. The optical connector device of claim 20, wherein the plug connector and the jack connector are connected to each other by an adapter.

* * * * *